(12) United States Patent
Nakagawa et al.

(10) Patent No.: US 7,214,134 B2
(45) Date of Patent: May 8, 2007

(54) FIXED CONSTANT VELOCITY UNIVERSAL JOINT

(75) Inventors: Tohru Nakagawa, Shizuoka-ken (JP); Morihiro Wada, Shizuoka-ken (JP)

(73) Assignee: NTN Corporation, Osaka-fu (JP)

( * ) Notice: Subject to any disclaimer, the term of this patent is extended or adjusted under 35 U.S.C. 154(b) by 234 days.

(21) Appl. No.: 11/008,967

(22) Filed: Dec. 13, 2004

(65) Prior Publication Data

US 2005/0148397 A1 Jul. 7, 2005

(30) Foreign Application Priority Data

Dec. 25, 2003 (JP) .............................. 2003-430246

(51) Int. Cl.
*F16D 3/224* (2006.01)
(52) U.S. Cl. ...................... 464/145; 464/906
(58) Field of Classification Search ................ 464/140, 464/145, 146, 906
See application file for complete search history.

(56) References Cited

U.S. PATENT DOCUMENTS

2002/0077186 A1 6/2002 Hosoya et al.
2003/0017877 A1 1/2003 Kobayashi et al.
2005/0261067 A1 11/2005 Kobayashi et al.

FOREIGN PATENT DOCUMENTS

| EP | 0 892 187 A2 | 1/1999 |
| JP | 2002-323061 | 4/2001 |
| JP | 2003-4062 | 6/2001 |

*Primary Examiner*—Greg Binda
(74) *Attorney, Agent, or Firm*—Arent Fox LLP (57) ABSTRACT

A fixed constant velocity universal joint includes: an outer ring having a plurality of track grooves extending axially in its inner spherical surface; an inner ring having a plurality of track grooves extending axially in its outer spherical surface; torque transmission balls arranged in ball tracks formed by cooperation of the track grooves of the outer ring and the track grooves of the inner ring; and a cage having pockets for retaining the torque transmission balls. The center of the track grooves of the outer ring and the center of the track grooves of the inner ring are offset from the spherical center of the inner spherical surface and the spherical center of the outer spherical surface, respectively, by the same distance axially in opposite directions. An axial clearance between the pockets and the torque transmission balls is set within the range of −0.006 and −0.035 mm. A spherical portion clearance between the cage and the inner ring is set so that a clearance-to-diameter ratio falls within the range of 0.9 and 2.3.

5 Claims, 7 Drawing Sheets

PCD CLEARANCE SENSITIVITY CHART

FIG. 9

INNER-RING TRACK CONTACT RATIO SENSITIVITY CHART

FIG. 10

FIXED CONSTANT VELOCITY UNIVERSAL JOINT

BACKGROUND OF THE INVENTION

1. Field of the Invention

The present invention relates to a fixed constant velocity universal joint. Constant velocity universal joints are components of power transmission systems in motor vehicles and various industrial machines, intended to couple a rotational shaft on the driving side and a rotational shaft on the driven side for the sake of torque transmission at constant angular velocity. The constant velocity universal joints are divided into fixed type and slide type. The slide type allows both an angular displacement and an axial displacement while the fixed type allows an angular displacement alone.

2. Description of the Related Art

When a fixed constant velocity universal joint forms an angle, there occurs a force in the bending direction. Take, for example, a fixed constant velocity universal joint on the drive shaft of a front-wheel drive car. In steering the car, an outer ring fixed to the front axle forms an angle. The joint then forms the angle while pushing torque transmission balls held between track grooves of the outer ring and track grooves of an inner ring, and a cage retaining the torque transmission balls. Here, rolling and sliding frictions occur between the track grooves of the inner and outer rings and the torque transmission balls. Sliding frictions also occur between the inner spherical surface of the outer ring and the outer spherical surface of the cage, and between the outer spherical surface of the inner ring and the inner spherical surface of the cage. As a result, a reactive force arises in the direction opposite to the bending direction. This reactive force will be referred to as a bending direction load.

Conventionally, internal design specifications of a fixed constant velocity universal joint have been discussed with emphasis on joint functions, or strength and durability, alone. No consideration has been actively given to a reduction of the bending direction load, or an improvement in flexibility. At best, the bending direction load has been only checked for the actual value within the internal specifications for securing required strength and durability.

Excessive bending direction loads can hinder smooth joint movement, and in the case of a fixed constant velocity universal joint to be used with the drive shaft of a front-wheel drive car, give a sense of discomfort in steering operations. The lower flexibility also means that the fixed constant velocity universal joint cannot sufficiently absorb vibrations and forces to be absorbed by the formation of an angle, in which case the vibrations and forces might be transmitted to the car-body side through the shaft. Vibrations and forces can also enter in the opposite way, possibly affecting the NVH performance of the vehicle.

SUMMARY OF THE INVENTION

It is a main object of the present invention to provide a fixed constant velocity universal joint in which a bending direction load occurring in changing the operating angle of the joint is reduced as means for improving the NVH performance.

A fixed constant velocity universal joint according to the present invention comprises: an outer ring having a plurality of track grooves extending axially in an inner spherical surface thereof; an inner ring having a plurality of track grooves extending axially in an outer spherical surface thereof; torque transmission balls arranged in ball tracks formed by cooperation of the track grooves of the outer ring and the track grooves of the inner ring; and a cage having pockets for retaining the torque transmission balls. The center of the track grooves of the outer ring and the center of the track grooves of the inner ring are offset from the spherical center of the inner spherical surface and the spherical center of the outer spherical surface, respectively, by the same distance axially in opposite directions. An axial clearance between the pockets and the torque transmission balls is set within a range of −0.006 and −0.035 mm. A radial clearance between the cage and the inner ring is set so that a clearance-to-diameter ratio falls within a range of 0.9 and 2.3. Here, the clearances are in terms of diameters.

Figure 6:
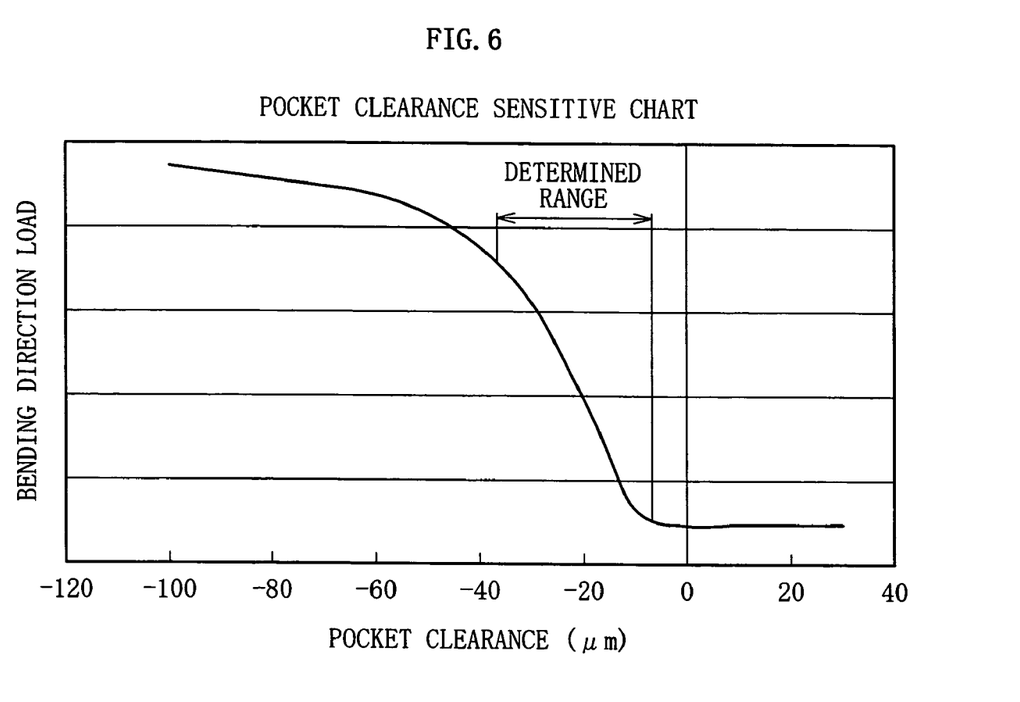
FIG. 6 is a pocket clearance sensitivity chart.

FIG. 6 shows the relationship between a pocket clearance and the bending direction load (pocket clearance sensitivity chart). It can be seen from this chart that the greater the pocket clearance is, or the smaller the exposed thread is, the higher the effect of reducing the bending direction load becomes. The effect converges beyond around −0.005 mm. To determine the dimension in view of a reduction in the bending direction load, it is necessary to set an upper limit of −0.005 mm or so and a lower limit as high as possible.

Next, other functional constraints will be discussed. When the pocket clearance is set in the positive region, this clearance can cause the torque transmission balls and the cage to contact each other, possibly producing slapping sound. Positive pocket clearances can also hamper the original function of the cage, or the function of retaining the torque transmission balls at appropriate positions, with a deterioration in the velocity constancy of the joint. The upper limit of the pocket clearance must therefore be 0 mm or less. Nevertheless, the clearance might increase due to wear of the pocket surfaces, depending on the use conditions. Considering the past records of the secular wear of the pockets (past records on benchmarks and in actual vehicles: approximately 0.005 to 0.006 mm), the upper limit is thus set at −0.006 mm. The lower limit is set at −0.035 mm in order to secure a greater pocket clearance for reducing the bending direction load, and in consideration of minimum values (past records in mass production) within the range of machining tolerances satisfying the existing process capabilities. Here, various dimensional controls can be added further to secure the process capabilities and reduce the range of machining tolerances as well. The lower limit in this case is −0.025 mm. As a result, the favorable range of pocket clearances is from −0.006 to −0.035 mm, and preferably from −0.006 to −0.025 mm.

Figure 7:
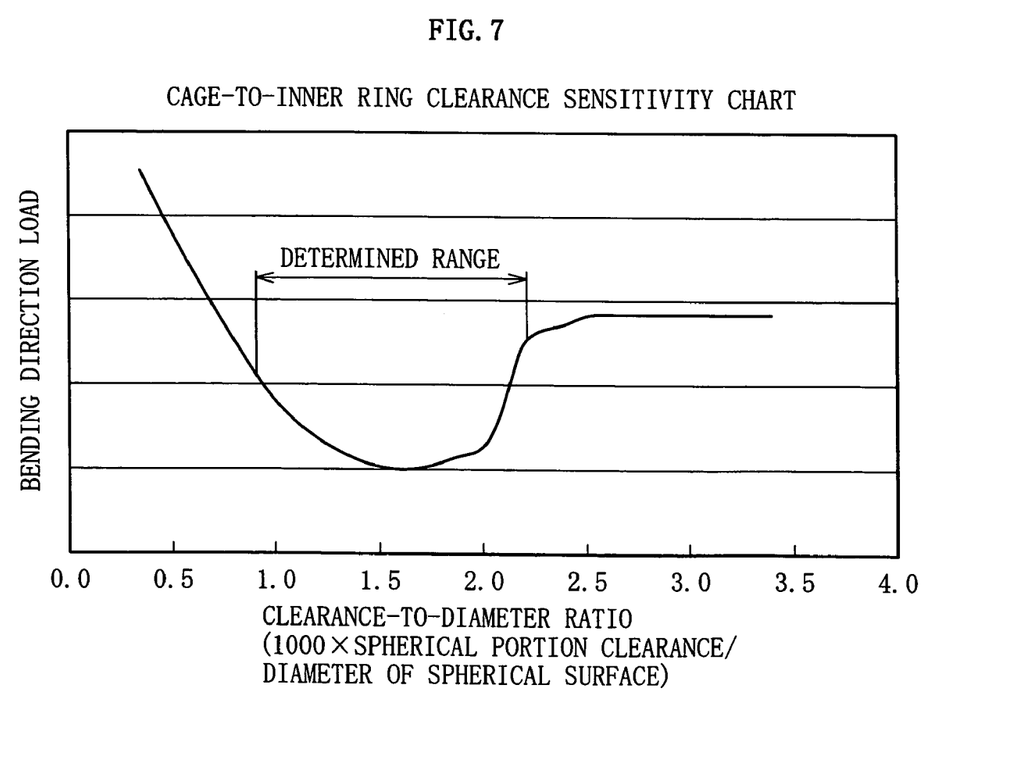
FIG. 7 is a cage-to-inner-ring clearance sensitivity chart.

FIG. 7 shows the relationship between the clearance-to-diameter ratio of the radial clearance (hereinafter, referred to as spherical portion clearance) between the outer spherical surface of the inner ring and the inner spherical surface of the cage, and the bending direction load (cage-to-inner-ring clearance sensitivity chart). From this chart, it can be seen that the effect has some peak characteristics. In FIG. 7, the abscissa indicates the clearance-to-diameter ratio, and the ordinate the bending direction load. Here, the clearance-to-diameter ratio is determined in order to make the spherical portion clearance between the inner spherical surface of the cage and the outer spherical surface of the inner ring dimensionless. The clearance-to-diameter ratio is the quotient of the spherical portion clearance divided by the reference diameter of the inner spherical surface of the cage (=the reference diameter of the outer spherical surface of the inner ring), multiplied by 1000. Now, taking the dimension at which the effect of reducing the bending direction load peaks as a central value, the range will be determined within the range of tolerances satisfying the process capabilities. In FIG. 7, the clearance-to-diameter ratio at which the effect of reducing the bending direction load peaks falls around 1.6, or within the range of 0.9 and 2.3 when the range of tolerances is taken into account. It is confirmed from FIG. 7 that the settings in this range can minimize the range of variations of the bending direction load, thereby maximizing the effect of reducing the bending direction load.

Now, the influence of the spherical portion clearance on other functions will be discussed. It has been known that excessive spherical portion clearances can cause abnormal noise (see Japanese Patent Laid-Open Publication No. 2002-323061). In this respect, samples taking account of secular wear, given clearance-to-diameter ratios of 2.6 or so, were evaluated for abnormal noise, and found to produce no abnormal noise across the joint angles. Smaller settings might hamper the operability of the inner ring and the cage. The concern about the operability is negligible, however, since the lower limit in the foregoing range is set sufficiently higher than the low level that affects the operability (for example, 0.3). The foregoing range for maximizing the effect of reducing the bending direction load thus has no adverse effect on the other functions. The spherical portion clearance between the outer spherical surface of the inner ring and the inner spherical surface of the cage is thus set so that the clearance-to-diameter ratio falls within the range of 0.9 and 2.3.

The track grooves of the outer ring and the track grooves of the inner ring may be provided with a straight portion having a straight groove bottom. The present invention is thus applicable to both of the following: a fixed constant velocity universal joint (BJ) in which the center of the track grooves of the outer ring and the center of the track grooves of the inner ring are offset from the spherical center of the inner spherical surface and the spherical center of the outer spherical surface, respectively, by the same distance axially in opposite directions; and a fixed constant velocity universal joint (UJ) in which the center of the track grooves of the outer ring and the center of the track grooves of the inner ring are offset from the spherical center of the inner spherical surface and the spherical center of the outer spherical surface, respectively, by the same distance axially in opposite directions, and the track grooves of the outer and inner rings are each provided with a straight portion having a straight groove bottom.

Recently, the wheelbases are often increased in view of improved passive safety of motor vehicles. To prevent the motor vehicles from increasing in the turning radius accordingly, it is desired to increase the steering angle of the front wheels by providing fixed constant velocity universal joints of wider angles. The need for wider angles can be met with a fixed constant velocity universal joint (UJ) of undercut-free type in which the track grooves are shaped parallel to the axial direction at the opening side of the outer ring. The fixed constant velocity universal joint of undercut-free type is characterized by the structure that the track grooves of the outer and inner rings have no undercut and allow large operating angles.

Figure 8:
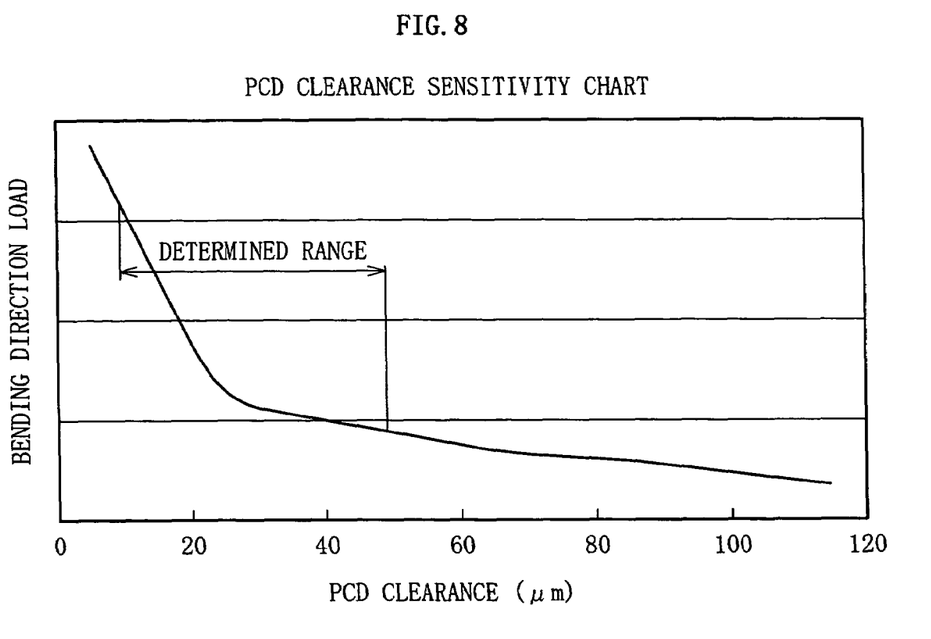
FIG. 8 is a PCD clearance sensitivity chart.

PCD clearances of 0.009 to 0.060 mm are preferable. As employed herein, the "PCD clearance" refers to a difference between the pitch circle diameter $PCD_{OUTER}$ of the track grooves of the outer ring and the pitch circle diameter $PCD_{INNER}$ of the track grooves of the inner ring. FIG. 8 shows the relationship between the PCD clearance and the bending direction load (PCD clearance sensitivity chart). From this chart, it can be seen that the PCD clearance can be increased to reduce the bending direction load. Since the sensitivity is higher at smaller PCD clearances, the lower limit can be increased for higher effects. It has been already known that excessive PCD clearances can deteriorate the overriding durability of the contact ellipses due to other functional constraints (see Japanese Patent Laid-Open Publication No. 2002-323061), and the upper limit is set at 0.050 mm. Here, the lower limit is determined in consideration of machining tolerances satisfying the existing process capabilities. FIG. 8 shows, however, that the effect of reducing the bending direction load is expected to increase toward the upper limit. Extended upper limits have been examined on this account, with the conclusion that the upper limit can be extended up to 0.060 when such factors as evaluation results on durability, the rate of decrease of the overriding durability in desk check, and past records of constant velocity universal joints are taken into account. Here, the lower limit is set at 0.009 mm in consideration of the machining tolerances satisfying the existing process capabilities. Various dimensional controls can also be added further to secure the process capabilities and reduce the range of machining tolerances as well. Then, the lower limit can be set at 0.019 mm. Consequently, the favorable range of PCD clearances for reducing the bending direction load and securing necessary functions is from 0.009 to 0.060 mm, and preferably from 0.019 to 0.060 mm.

Figure 9:
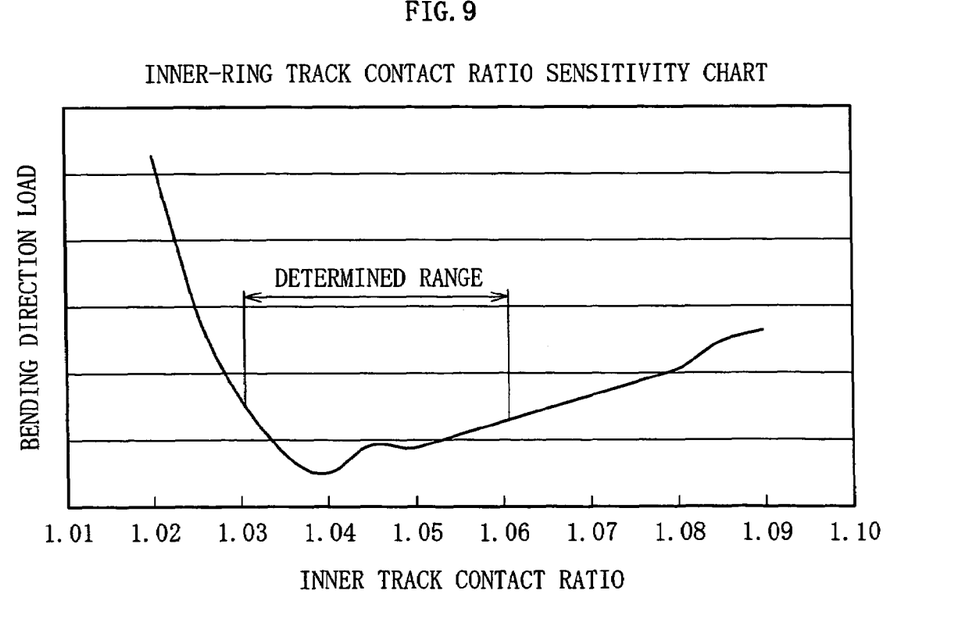
FIG. 9 is an inner-ring track contact ratio sensitivity chart.

An inner-ring track contact ratio is preferably set at 1.03 to 1.06. As employed herein, the inner-ring track contact ratio refers to the ratio of the radius of curvature $R_T$ of the track grooves of the inner ring to the radius $R_B$ of the balls, or the value $R_T/R_B$. FIG. 9 shows the relationship between the inner-ring track contact ratio and the bending direction load (inner-ring track contact ratio sensitivity chart). From this chart, it can be seen that the effect of reducing the bending direction load has some peak characteristics. Then, taking the dimension at which the effect of reducing the bending direction load peaks as a central value, the range of inner-ring track contact ratios will be determined within the range of tolerances satisfying the process capabilities. In FIG. 9, the inner-ring track contact ratio at which the effect of reducing the bending direction load peaks falls on 1.04, or within the range of 1.025 and 1.055 when the range of tolerances is taken into account. Nevertheless, when FIG. 9 is checked for the range of variations of the bending direction load within this range, it is found that the effect of reducing the bending direction load drops near the lower limit. The range of inner-track contact ratios for minimizing the range of variations is from 1.03 to 1.06 when determined with the range of tolerances unchanged. This range of settings can thus maximize the effect of reducing the bending direction load.

Now, other functional constraints will be discussed. When the inner-ring track contact ratio is set excessively higher, the surface pressure of the contact portion increases to deteriorate the flaking durability of the ball contact portions. Thus, the upper limit of the inner-ring track contact ratio must not exceed a maximum contact surface pressure having no impact on the flaking durability. This maximum contact surface pressure is no higher than 2.7 GPa when under a basic torque (see Japanese Patent Laid-Open Publication No. 2003-4062). Here, the term "basic torque" refers to a torque value determined by the track grooves of the outer and inner rings and the contact stress (Hertz's stress) of the torque transmission balls, in which a life of 1500 hours is obtained at 100 rpm. The basic torque, also commonly called continuous torque, is a reference torque for use in the life calculation of constant velocity universal joints. That is, the contact ratio between the track grooves of the outer and inner rings and the torque transmission balls is set so that the contact surface pressure under the basic torque is 2.7 GPa or less. This provides durability equivalent to or higher than that of conventional products. Examination showed that in the foregoing range of settings intended for a reduction in the bending direction load, the upper limit provides a maximum contact surface pressure of no higher than 2.7 GPa under the basic torque. Deterioration of the flaking durability is thus avoided. Moreover, flaking durability tests on products having the upper limit of the track contact ratio showed satisfactory results.

Too low an inner-ring track contact ratio can decrease the load torque allowable to the track grooves in which the torque transmission balls roll (allowable load torque). The reason for this is that when the inner-ring track contact ratio is made smaller, the contact ellipses occurring in the contact positions between the torque transmission balls and the track grooves become greater even under the same transmission torque. This makes it easier for the contact ellipses to come out of the edges of the track grooves. When the contact ellipses come out of the edges excessively, stress can concentrate on the edges. This can cause chipping and deformation of the edges easily, thereby lowering the overriding durability of the contact ellipses.

At the lower limit of the foregoing range, the allowable load torque can be secured on a level equivalent to that of existing actual products, i.e., a level not affecting the necessary functions.

The number of the torque transmission balls may be eight. While this type of constant velocity universal joint, using balls as the torque transmission members, typically has six torque transmission balls, the use of eight torque transmission balls can reduce the proportion of the load for each single ball to the entire load capacity of the joint. It is therefore possible to reduce the diameter and the pitch circle diameter of the torque transmission balls as compared to six-ball products of the same bearing number. As a result, it is also possible to reduce the outer diameter of the outer ring.

Three types of samples were prototyped and evaluated for actual bending direction loads. The samples included: two high-effect products in which the foregoing items were set to maximize the effect of reducing the bending direction load; a low-effect product with settings for a minimum effect; and a conventional product. As shown in Table 1, the values of the respective items were within the ranges of tolerances described above.

TABLE 1

| ITEM | UNIT | HIGH-EFFECT PRODUCT | LOW-EFFECT PRODUCT |
| --- | --- | --- | --- |
| POCKET CLEARANCE | mm | −0.005 | −0.025 |
| PCD CLEARANCE | mm | 0.052 | 0.011 |
| CLEARANCE-TO-DIAMETER RATIO OF SPHERICAL PORTION CLEARANCE BETWEEN CAGE AND INNER RING | — | 1.4 | 2.5 |
| INNER-RING TRACK CONTACT RATIO | — | 1.04 | 1.03 |

Items in Table are in average values.

Figure 10:
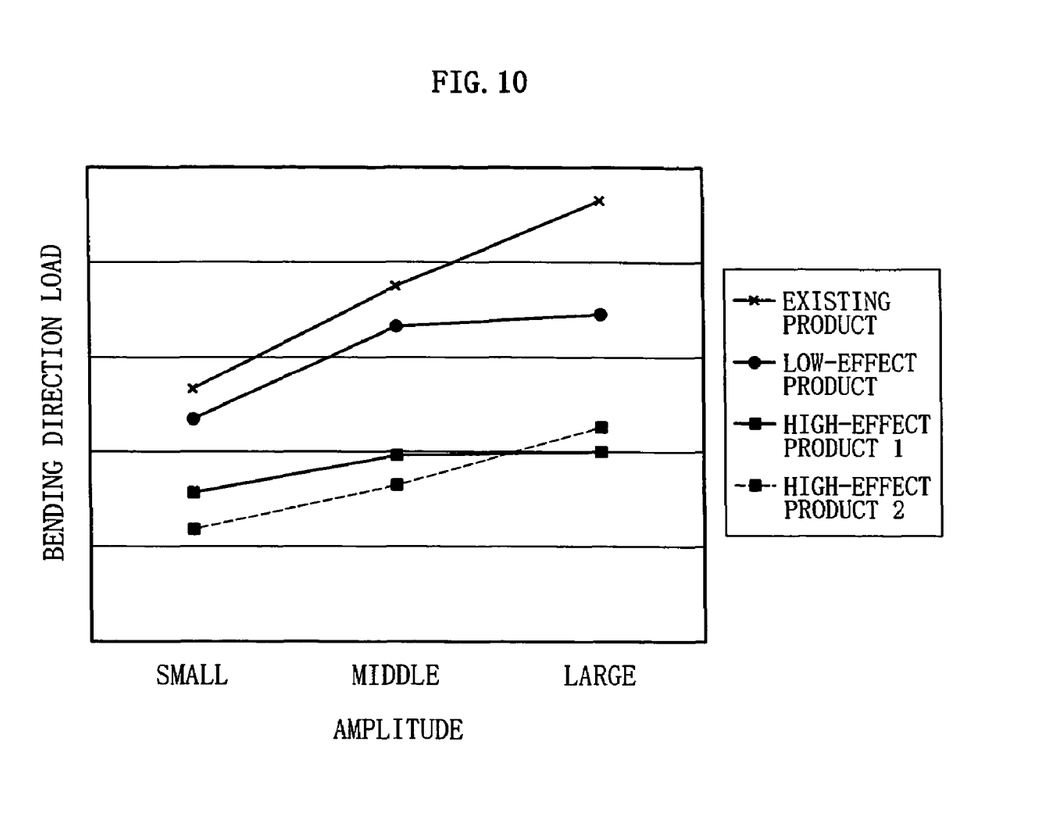
FIG. 10 is a chart for showing analytical results on the bending direction load.

FIG. 10 shows the results of evaluation, which confirm the same tendency as that of the analytical results. That is, the bending direction load of the conventional product increased in proportion to the amplitude. The low-effect product showed the same tendency as that of the conventional product at the small and middle amplitudes, but exhibited the effect of reducing the bending direction load at the large amplitude. In contrast to the foregoing two, the high-effect products showed only slight increases in the bending direction load even at greater amplitudes.

Hereinafter, embodiments of the present invention will be described with reference to the drawings.

DETAILED DESCRIPTION OF THE PREFERRED EMBODIMENTS

Figure 1:
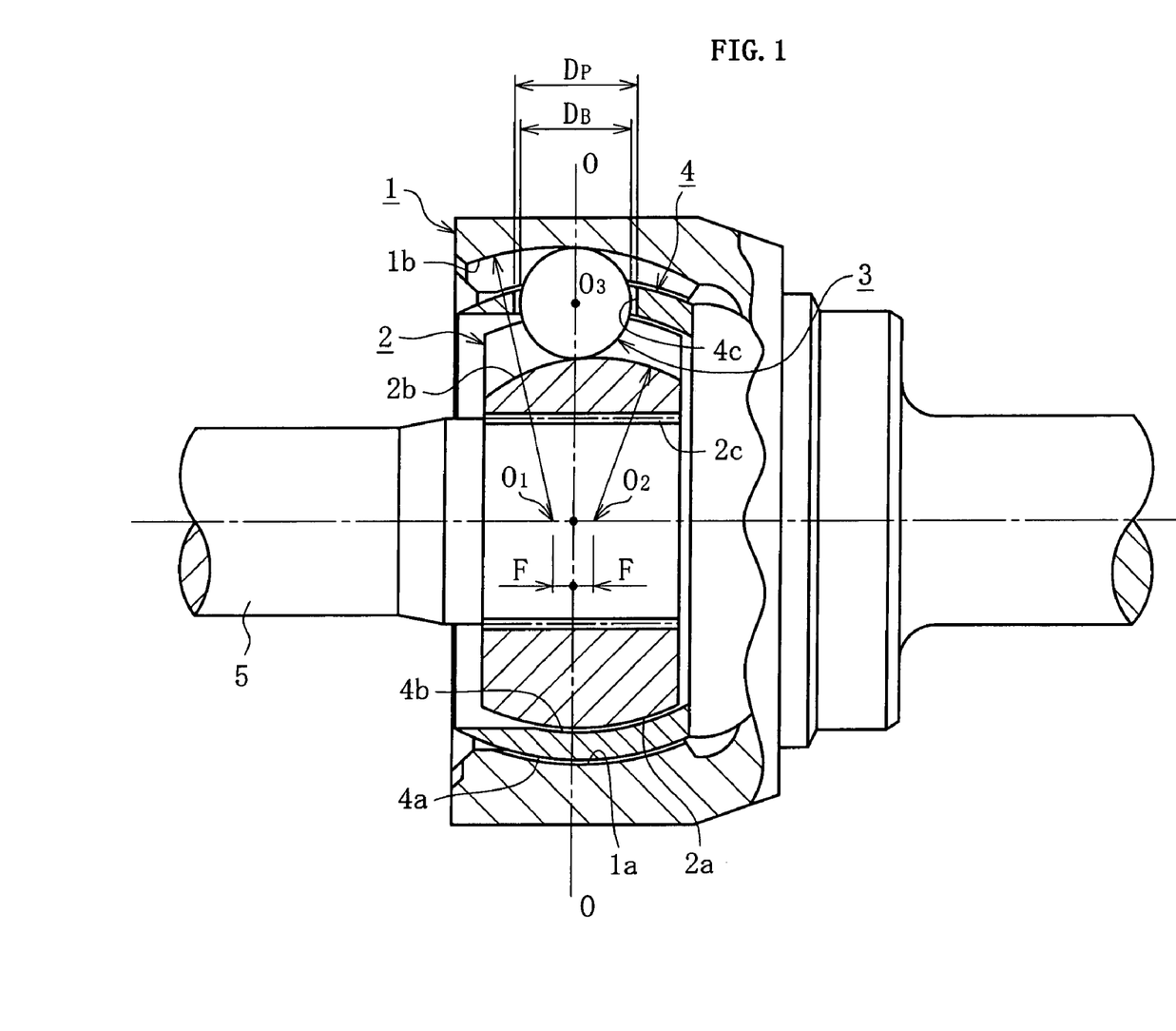
FIG. 1 is a longitudinal sectional view of a Rzeppa type constant velocity universal joint.
Figure 2:
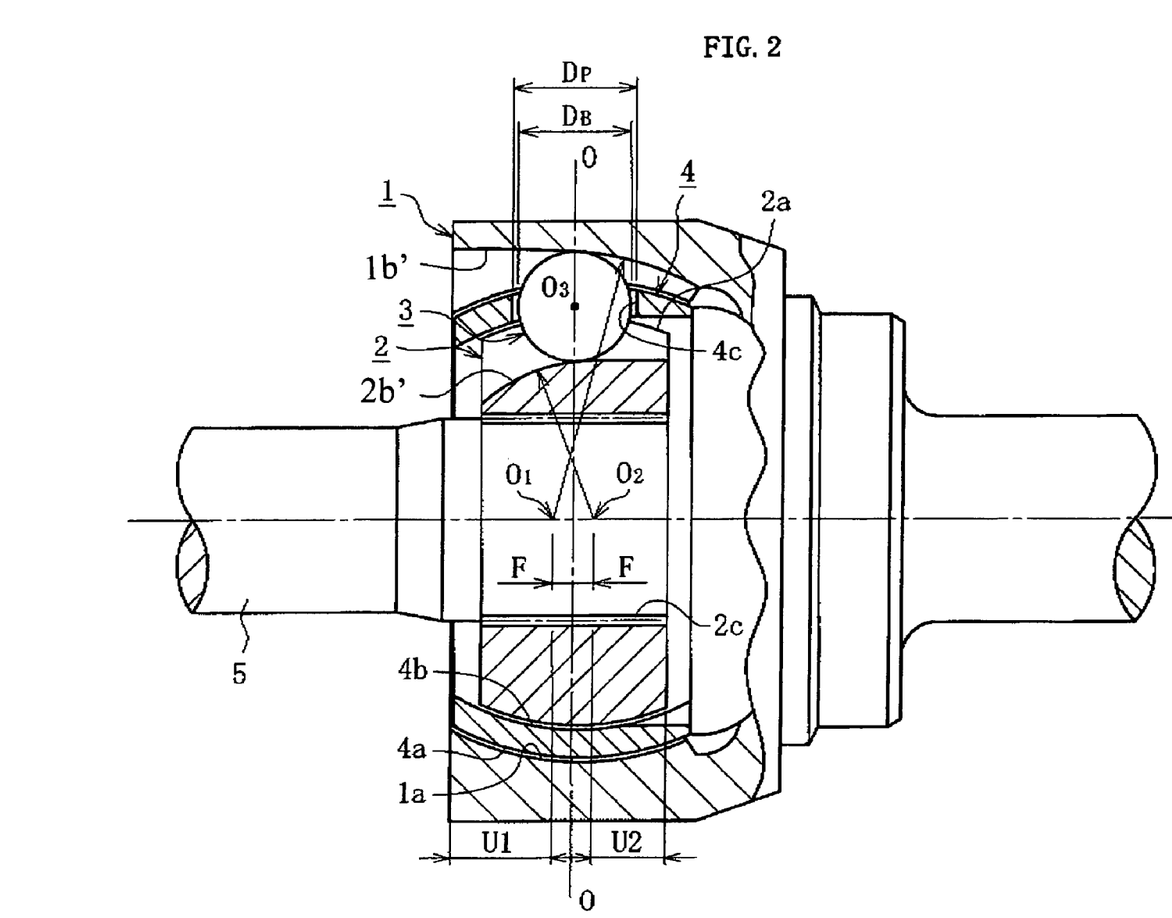
FIG. 2 is a longitudinal sectional view of a undercut-free type constant velocity universal joint.

In the drawings, FIG. 1 shows a fixed constant velocity universal joint (BJ) which is a Rzeppa type constant velocity universal joint. FIG. 2 shows a fixed constant velocity universal joint of undercut-free type (UJ). The joint of FIG. 1 and the joint of FIG. 2 have the same cross sections, which are thus shown as a single cross-sectional view in FIG. 3. Note that the clearances are shown exaggerated in the diagrams.

Figure 3:
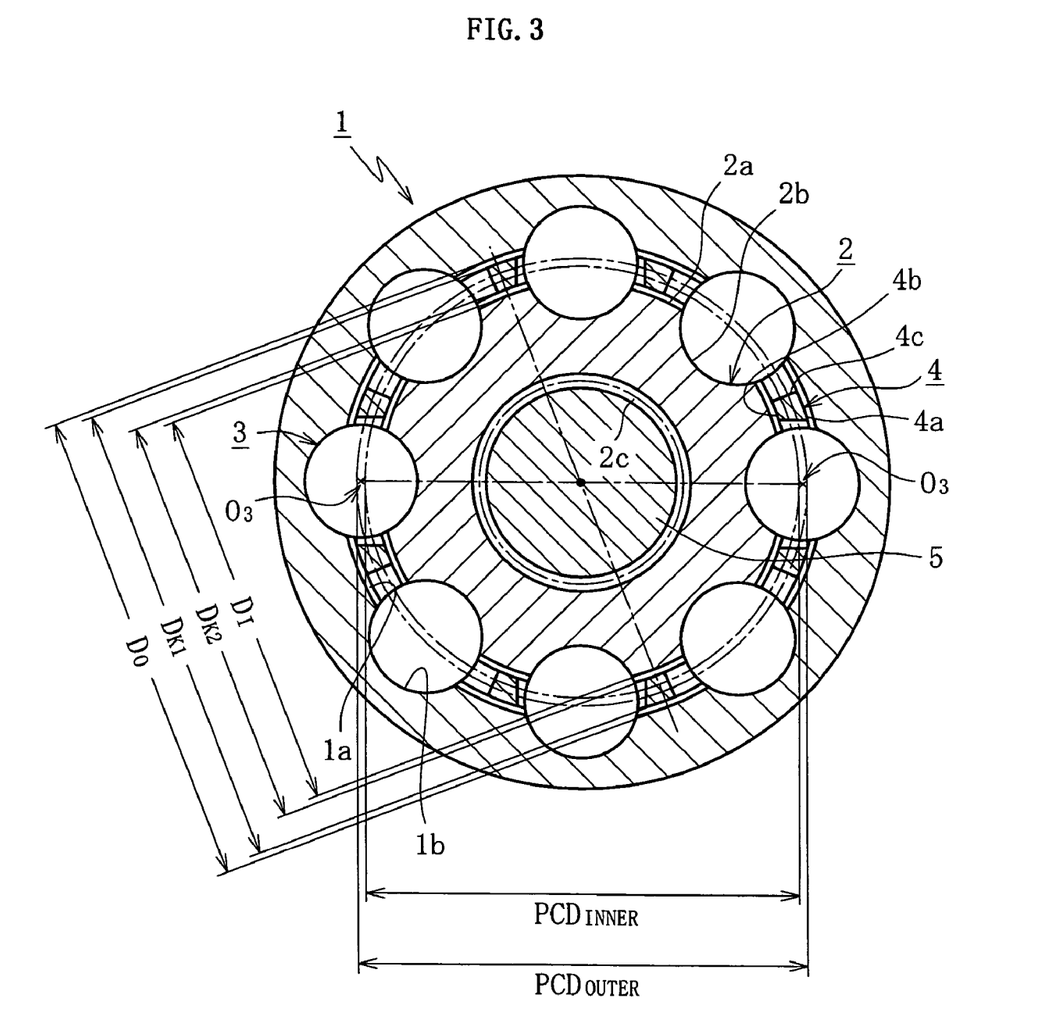
FIG. 3 is a cross-sectional view of the constant velocity universal joints of FIGS. 1 and 2.

Now, the constant velocity universal joint (BJ) shown in FIG. 1 consists chiefly of an outer ring 1, an inner ring 2, torque transmission balls 3, and a cage 4. The outer ring 1 is composed of a cup part and a shaft part. The shaft part establishes connection with one of two shafts to couple. The cup part has an inner spherical surface $1a$ of partially spherical shape. Eight track grooves $1b$ extending in the axial direction are formed in the inner spherical surface $1a$ at circumferential regular intervals. The inner ring 2 has an outer spherical surface $2a$ of partially spherical shape. Eight track grooves $2b$ extending in the axial direction are formed in the outer spherical surface $2a$ at circumferential regular intervals. The inner ring 2 has a serration hole part $2c$ for establishing connection with a serration shaft part of the other of the two shafts to couple, such as a countershaft 5 of a driving shaft. The track grooves $1b$ of the outer ring 1 and the track groove $2b$ of the inner ring 2 are paired, and each of the torque transmission balls 3 is loaded between one of the pairs of track grooves $1b$ and $2b$. The torque transmission balls 3 are accommodated in pockets $4c$ of the cage 4. Note that FIG. 3 shows the mode of embodiment with eight torque transmission balls 3. The cage 4 is interposed between the inner spherical surface $1a$ of the outer ring 1 and the outer spherical surface $2a$ of the inner ring 2. The reference numerals $4a$ and $4b$ designate the outer spherical surface and inner spherical surface of the cage 4, respectively.

The track grooves $1b$ and $2b$ have an arc shape in the longitudinal section of the joint (FIG. 1). Then, the center $O_1$ of the track grooves $1b$ of the outer ring 1 and the center $O_2$ of the track grooves $2b$ of the inner ring 2 are offset from the spherical center of the inner spherical surface 1a and the spherical center of the inner spherical surface 2a, respectively, by the same distance F axially in opposite directions. More specifically, the center $O_1$ is offset toward the opening side of the joint, and the center $O_2$ toward the bottom side of the joint. Consequently, the ball tracks formed by the cooperation of the track grooves 1b of the outer ring 1 and the track grooves 2b of the inner ring 2 are shaped like wedges widening in one axial direction, or toward the opening side of the joint in the example shown in FIG. 1.

The outer spherical surface 4a of the cage 4 and the inner spherical surface 1a of the outer ring 1, or a guide way for the outer spherical surface 4a of the cage 4, both have their respective spherical centers within a joint center plane O—O. The joint center plane O—O includes the center $O_3$ of the torque transmission balls 3. Moreover, the inner spherical surface 4b of the cage 4 and the outer spherical surface 2a of the inner ring 2, or a guide way for the inner spherical surface 4b of the cage 4, both have their respective spherical centers within the joint center plane O—O. Consequently, the offset F of the center $O_1$ of the track grooves 1b of the outer ring 1 is the axial distance between the center $O_1$ and the joint center plane O—O. The offset F of the center $O_2$ of the track grooves 2b of the inner ring 2 is the axial distance between the center $O_2$ and the joint center plane O—O. The two offsets F are the same.

Now, the constant velocity universal joint (UJ) shown in FIG. 2 differs from the foregoing constant velocity universal joint (BJ) of FIG. 1 only in that the track 1b' grooves-of the outer ring 1 and the track grooves 2b' of the inner ring 2 are provided with straight portions U1 and U2 having a straight groove bottom, respectively. Throughout the drawings, the same parts or substantially the same parts will thus be designated by identical numerals. Redundant description will be omitted. This constant velocity universal joint (UJ) allows a maximum operating angle greater than that of the constant velocity universal joint (BJ) of FIG. 1, because of the provision of the straight portions U1 and U2 on the track grooves 1b of the outer ring 1 and the track grooves 2b of the inner ring 2, respectively.

In these constant velocity universal joints of FIGS. 1 and 2, when the outer ring 1 and the inner ring 2 make an angular displacement, the torque transmission balls 3 accommodated in the pockets 4c of the cage 4 are always maintained in the bisector plane of the operating angle. This ensures the velocity constancy of the joint regardless of the operating angle.

Description will now be given of the dimensions of the Rzeppa type constant velocity universal joint (BJ) of FIG. 1 and the undercut-free type constant velocity universal joint (UJ) of FIG. 2, which have the foregoing configurations. The axial clearance between the pockets 4c of the cage 4 and the torque transmission balls 3, or a difference $(D_P-D_B)$ between the axial dimension $D_P$ of the pockets 4c and the diameter $D_B$ of the torque transmission balls 3, is set within the range of −0.006 and −0.035 mm, or preferably −0.006 and −0.025 mm. The spherical portion clearance between the inner spherical surface 4b of the cage 4 and the outer spherical surface 2a of the inner ring 2, or a difference $(D_{K2}-D_I)$ between the inner diameter $D_{K2}$ of the cage 4 and the outer diameter $D_I$ of the inner ring 2 as shown in FIG. 3, is set so that the clearance-to-diameter ratio $\{1000(D_{K2}-D_I)/D\}$ falls within the range of 0.9 and 2.3. Here, D is the reference inner diameter of the cage (=the reference outer diameter of the inner ring). The PCD clearance, or a difference $(PCD_{OUTER}-PCD_{INNER})$ between the pitch circle diameter $PCD_{OUTER}$ of the track grooves 1b of the outer ring 1 and the pitch circle diameter $PCD_{INNER}$ of the track grooves 2b of the inner ring 2, is set within the range of 0.009 and 0.060 mm. Moreover, the ratio $(R_T/R_B)$ of the radius of curvature $R_T$ of the track grooves 2b of the inner ring 2 to the radius $R_B$ of the torque transmission balls 3, or the inner-ring track contact ratio, is set within the range of 1.03 and 1.06.

Figure 4:
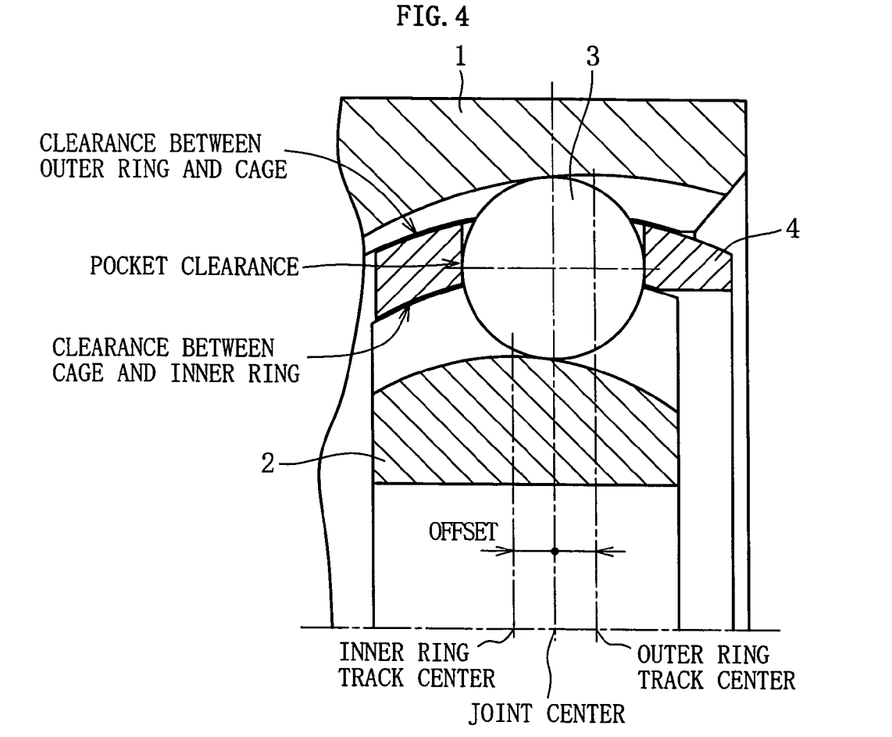
FIG. 4 is an enlarged sectional view of essential parts of FIG. 1.
Figure 5:
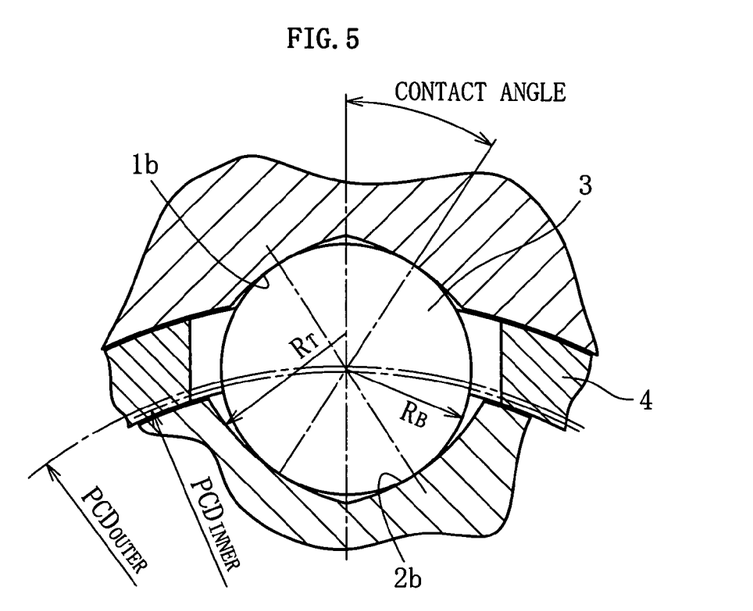
FIG. 5 is an enlarged sectional view of essential parts of FIG. 3.

Now, description will be given of how the axial clearance $(D_P-D_B)$, the clearance-to-diameter ratio $\{1000(D_{K2}-D_I)/D\}$, the PCD clearance $(PCD_{OUTER}-PCD_{INNER})$, and the inner-ring track contact ratio $(R_T/R_B)$ described above were selected. Internal specification items that seemed to act on the effect of reducing the bending direction load were picked up. For each of the items, high and low, two levels of settings were established so as not to affect necessary functions. A mechanism analysis was conducted for each level of each item in conformity to the design of experiments (JIS Z 8101). The analytical results were examined to derive effective items for reducing the bending direction load. The internal specification items that seemed to act on the bending torque are as follows (see FIGS. 4 and 5):

A. track offset,
B. PCD clearance,
C. spherical portion clearance between the outer ring and the cage,
D. spherical portion clearance between the cage and the inner ring,
E. pocket clearance,
F. track contact angle, and
G. track contact ratio.

These items were assigned to the factors of an orthogonal table (L8) for an eight-condition analysis, whereby a survey was conducted on factors significant for a reduction of the moment load (Mz) in the bending direction and the bending direction load (Fy). Table 2 shows the analytical results and the conclusions based on the analysis of variance.

TABLE 2

| ITEM | MINIMUM SETTING | MAXIMUM SETTING | CONCLUSION |
| --- | --- | --- | --- |
| TRACK OFFSET | 174.4 | 177.6 | — |
| PCT CLEARANCE | 190.4 | 171.6 | SIGNIFICANT |
| CLEARANCE BETWEEN OUTER RING AND CAGE | 176.9 | 175.1 | — |
| CLEARANCE BETWEEN CAGE AND INNER RING | 181.8 | 170.2 | SIGNIFICANT |
| POCKET CLEARANCE | 252 | 100 | HIGHLY SIGNIFICANT |
| TRACK CONTACT ANGLE | 174.6 | 177.3 | — |
| TRACK CONTACT RATIO | 189.8 | 162.2 | HIGHLY SIGNIFICANT |

The numeric values in Table 2 are ones taking account of the moment and load in the bending direction. The higher the values are, the harder to bend. In other words, higher values mean greater bending direction loads. Here, the analytical results are summarized with the value of the product having the maximum pocket clearance, showing the minimum bending direction load among the analytical results, as 100. (The track contact ratios were concerned with the inner ring alone. The reason is that examination on the degrees of contribution of the outer and inner rings showed that the inner ring contributed at a higher degree.) The dimensions of the factors concluded to be highly significant and significant were determined in consideration of the influence on such basic functions as strength and durability, and the process capabilities (including machining tolerances). To ensure the effect of reducing the bending direction load sufficiently, the settings were also optimized with consideration given to the sensitivities of the reducing effect in the sensitivity charts of the respective items.

What is claimed is:

1. A fixed constant velocity universal joint comprising:
   an outer ring having a plurality of track grooves extending axially in an inner spherical surface thereof;
   an inner ring having a plurality of track grooves extending axially in an outer spherical surface thereof;
   torque transmission balls arranged in ball tracks formed by cooperation of the track grooves of the outer ring and the track grooves of the inner ring; and
   a cage having pockets for retaining the torque transmission balls, wherein:
   the center of the track grooves of the outer ring and the center of the track grooves of the inner ring are offset from the spherical center of the inner spherical surface and the spherical center of the outer spherical surface, respectively, by the same distance axially in opposite directions;
   an axial clearance between the pockets and the torque transmission balls is set within a range of −0.006 and −0.035 mm; and
   a radial clearance between the cage and the inner ring is set so that a clearance-to-diameter ratio falls within a range of 0.9 and 2.3.

2. A fixed constant velocity universal joint as claimed in claim 1, wherein
   the track grooves of the outer ring and the track grooves of the inner ring are provided with a straight portion having a straight groove bottom.

3. A fixed constant velocity universal joint as claimed in claim 1, wherein
   PCD clearances are set to from 0.009 to 0.060 mm.

4. A fixed constant velocity universal joint as claimed in claim 1, wherein
   an inner-ring track contact ratio is set at 1.03 to 1.06.

5. A fixed constant velocity universal joint as claimed in claim 1, wherein
   the number of the torque transmission balls is eight.

* * * * *